US009354041B2

(12) United States Patent  (10) Patent No.: US 9,354,041 B2
Yamagata  (45) Date of Patent: May 31, 2016

(54) COORDINATE MEASURING APPARATUS

(71) Applicant: MITUTOYO CORPORATION, Kanagawa (JP)

(72) Inventor: Masaoki Yamagata, Kawasaki-shi (JP)

(73) Assignee: MITUTOYO CORPORATION, Kanagawa (JP)

( * ) Notice: Subject to any disclaimer, the term of this patent is extended or adjusted under 35 U.S.C. 154(b) by 149 days.

(21) Appl. No.: 14/483,723

(22) Filed: Sep. 11, 2014

(65) Prior Publication Data

US 2015/0077761 A1   Mar. 19, 2015

(30) Foreign Application Priority Data

Sep. 18, 2013 (JP) ................................ 2013-193501

(51) Int. Cl.
*G01B 11/24*  (2006.01)
*G01B 11/00*  (2006.01)
*G01B 11/25*  (2006.01)

(52) U.S. Cl.
CPC .............. *G01B 11/005* (2013.01); *G01B 11/24* (2013.01); *G01B 11/25* (2013.01)

(58) Field of Classification Search
CPC ......... G01B 11/14; G01B 11/24; G01B 11/30
USPC .................................. 356/601, 614, 620, 622
See application file for complete search history.

(56) References Cited

U.S. PATENT DOCUMENTS

| 3,680,414 A   * | 8/1972  | Ryswick  | B23B 13/06 82/124 |
| 7,324,217 B2 * | 1/2008  | Herrmann | G01B 11/25 356/601 |
| 8,929,642 B2 * | 1/2015  | Ichimaru | G01B 11/25 356/3.1 |
| 2005/0248774 A1* | 11/2005 | Herrmann | G01B 11/25 356/601 |
| 2014/0123509 A1 | 5/2014  | Furushima | 33/503 |

FOREIGN PATENT DOCUMENTS

JP   2012-127805 A   7/2012   ............. G01B 11/24

* cited by examiner

*Primary Examiner* — Roy M Punnoose
(74) *Attorney, Agent, or Firm* — Greenblum & Bernstein, P.L.C.

(57) ABSTRACT

Coordinate measuring apparatus includes a probe having an optical system emitting light along a plane at a workpiece, an image capture apparatus having image capture elements arranged on an image capture plane and capturing an image of the workpiece from a position different from that of the predetermined plane, and a controller controlling the emitting optical system. The controller determines whether the image capture elements arranged in an image capture region on the image capture plane detect light incident on the workpiece due to the light from the emitting optical system, turns on the light emitted from the emitting optical system when the image capture elements arranged within the image capture region detect the incident light, and blinks the light emitted from the emitting optical system at a predetermined periodicity when the image capture elements arranged within the image capture region do not detect the incident light.

9 Claims, 9 Drawing Sheets

COORDINATE MEASURING APPARATUS

CROSS-REFERENCE TO RELATED APPLICATIONS

The present application claims priority under 35 U.S.C. §119 of Japanese Application No. 2013-193501, filed on Sep. 18, 2013, the disclosure of which is expressly incorporated by reference herein in its entirety.

BACKGROUND OF THE INVENTION

1. Field of the Invention

The present invention relates to a coordinate measuring apparatus measuring a shape of a measured object by emitting light at the measured object and capturing an image thereof.

2. Description of Related Art

Conventionally, a shape measuring apparatus is known in which a surface shape of a measured object (hereafter referred to as a "work piece" or "workpiece") is measured by scanning a surface of the work piece with a probe and acquiring position coordinates, for example, of each portion of the work piece. Known examples of such a shape measuring apparatus include a shape measuring apparatus measuring position coordinates of a work piece and including a measurer (stylus) making contact with a surface of the work piece, and a non-contact-type shape measuring apparatus in which measurement is performed by an optical system, without a measurer (stylus) touching a surface of a work piece.

A non-contact-type surface shape measuring apparatus of this kind includes a emitting optical system and a non-contact-type probe, the emitting optical system emitting light along a predetermined plane at a work piece from a predetermined emitting direction, and the non-contact-type probe being configured by an image capture apparatus capturing an image of a shape of light that is incident on the surface of the work piece. The emitting optical system includes a light source emitting laser light having a straight-line shape (a point laser) toward the work piece, and an emitted light adjuster adjusting the laser light emitted by the light source into a planar shape (sheet-like shape). According to this emitting optical system, emitted light (also referred to as a line laser, a laser sheet, a laser light sheet, etc.) is emitted along the predetermined plane toward the work piece surface, and light is incident at positions where the emitted light and the work piece surface intersect, the incident light corresponding to a shape thereof (i.e., light having a shape in an contour of the work piece). The image capture apparatus captures an image of the work piece (the incident light incident on the surface) from a predetermined image capture direction, which is different from the emitting direction of the light source.

With the above-noted configuration, the light incident on the work piece surface (i.e., spatial coordinates of an contour shape of the work piece) can be calculated using a triangulation method, based on the emitting direction of the emitting optical system, the image capture direction of the image capture apparatus, a distance between the emitting optical system and the image capture apparatus, and the captured image.

In the non-contact-type surface shape measuring apparatus of this kind, the emitting direction of the emitting optical system and the image capture direction are different, as noted above. Accordingly, in a case where a distance between the probe and the work piece becomes too small or too large, for example, the light incident on the work piece surface does not strike within an image capture region of the image capture apparatus and image capture is impossible. Verification as to whether the distance between the probe and the work piece is appropriate can be performed on a display; however, in such a case, an operator must visually register both the display and a sample stage, thus leading to reduced operability.

Conventionally, in order to resolve this issue, an instruction light emitter emitting instruction light having a wavelength different from that of the laser has been provided in addition to the probe, and in a case where the laser is outside the range where measurement is possible, the instruction light emitter is turned on and the instruction light is emitted at the work piece, thereby enabling verification as to whether the laser light is positioned within the range where measurement of the work piece is possible (Japanese Patent Laid-open Publication No. 2012-127805).

However, in the method described in Japanese Patent Laid-open Publication No. 2012-127805, in order to verify whether the laser light is positioned within an image capture region of the work piece, the instruction light emitter having a wavelength different from that of the laser light must be separately provided, which may increase manufacturing costs of the apparatus. In addition, the instruction light emitter is turned on separately from the laser light, therefore increasing power consumption, which may lead to heat drift or malfunction due to heat generated by an illumination light emitter. Even when a cooling fan is attached, vibration caused by the cooling fan may be transmitted to the probe, and thus measurement accuracy may be reduced. Moreover, in such a case, air holes must be provided in order to cool the measurement probe, and this has also been linked to a reduction in environmental resistance.

SUMMARY OF THE INVENTION

In view of the above, the present invention seeks to provide a coordinate measuring apparatus having a low cost and excellent operability and environmental resistance.

A coordinate measuring apparatus according to an aspect of the present invention includes a non-contact-type probe having a emitting optical system emitting emitted light along a predetermined plane at a work piece; an image capture apparatus having a plurality of image capture elements arranged on an image capture plane and capturing an image of the work piece from a position different from that of the predetermined plane; and a controller controlling the emitting optical system in response to an output signal of the image capture apparatus. Further, the controller determines whether the image capture elements arranged in a predetermined image capture region on the image capture plane detect incident light incident on a surface of the work piece due to the emitted light from the emitting optical system; turns on the light emitted from the emitting optical system in a case where the image capture elements arranged within the image capture region detect the incident light; and blinks the light emitted from the emitting optical system at a predetermined periodicity in a case where the image capture elements arranged within the image capture region do not detect the incident light.

In addition, the controller may also determine that the image capture elements arranged in the image capture region detect the incident light in a case where there are, among the image capture elements arranged within the image capture region, image capture elements for which an amount of light received is greater than a threshold value (refers to a minimum amount of light received to determine light reception by the image capture element, and likewise hereafter in the instant specification), and determine that the image capture elements arranged in the image capture region do not detect the incident light in a case where there are not, among the image capture elements arranged within the image capture region, image capture elements for which the amount of light received is greater than the threshold value.

Specifically, in the coordinate measuring apparatus according to the present invention, the light emitted from the emitting optical system is turned on in a case where the image capture elements arranged within the image capture region detect the incident light, and the light emitted from the emitting optical system blinks at a predetermined periodicity in a case where the image capture elements arranged within the image capture region do not detect the incident light. Accordingly, the light emitted from the emitting optical system blinks in a case where the distance between the probe and the work piece is outside the predetermined range of distance and the incident light is no longer imaged on the image capture elements arranged in the image capture region of the light-receiving surface of the image capture apparatus. Accordingly, a coordinate measuring apparatus can be provided having excellent operability and enabling an operator to verify whether the distance between the probe and the work piece is appropriate simply by viewing the probe and the work piece. In a case where the amount of light received on the image capture elements arranged in the image capture region on the light-receiving surface of the image capture apparatus is below the threshold value, a shape of the work piece cannot be measured, and therefore even when the light being emitted from the emitting optical system is made to blink, there is no effect on the measurement.

In addition, with the present invention, there is no need to provide the probe with an instruction light emitter, and therefore various heat-induced issues detailed above can be inhibited and, further, the probe can be made smaller and costs can be reduced by reducing the number of components.

In the coordinate measuring apparatus according to another aspect of the present invention, the distance between the probe and the work piece is detected according to a position of the image capture element which detected the incident light in a predetermined monitoring region, which is broader than the predetermined image capture region on the image capture plane and, in a case where the image capture elements arranged in the image capture region do not detect the incident light, the light emitted from the emitting optical system blinks at a periodicity corresponding to the detected distance. In the coordinate measuring apparatus according to an aspect of this kind, the distance between the probe and the work piece is detected by the image capture elements in the monitoring region, and therefore the distance between the probe and the work piece can be more favorably adjusted.

A coordinate measuring apparatus according to another aspect of the present invention is, through a first operation mode and a second operation mode, capable of selective operation. The controller detects the amount of light received by each of the image capture elements arranged in the image capture region and, in the first operation mode, turns on the light emitted from the emitting optical system in a case where there are, among the image capture elements arranged within the image capture region, image capture elements for which the amount of light received is greater than a threshold value, and blinks the light emitted from the emitting optical system at a predetermined periodicity in a case where there are not, among the image capture elements arranged within the image capture region, image capture elements for which the amount of light received is greater than the threshold value. In the second operation mode, in a case where there are image capture elements saturated by an amount of light received when each of the image capture elements in the image capture region receives light, the controller reduces light intensity of the light emitted from the emitting optical system during the subsequent light reception and, in a case where there are no image capture elements saturated by the amount of light received, the controller increases the light intensity of the light emitted from the emitting optical system during the subsequent light reception. Moreover, when the image capture elements are receiving light, in a case where the light intensity of the light emitted from the emitting optical system reaches a maximum intensity and the amount of light received is less than the threshold value, the light intensity of the light emitted from the emitting optical system is set to a minimum intensity during the subsequent light reception.

In the coordinate measuring apparatus according to such an aspect, the first operation mode can also be a manually operated measurement mode in which the probe is manually operated to carry out the measurement, while the second operation mode can also be an automatically operated measurement mode in which the probe is automatically operated to carry out the measurement. In a case where the coordinate measuring apparatus is driven by a CNC (computer numerical control) operation, for example, teaching may first be performed with respect to the coordinate measuring apparatus, then the coordinate measuring apparatus may operate automatically. Herein, when teaching is performed, the operator must visually register the probe and the work piece and, by employing the first operation mode, teaching can be readily performed. Meanwhile, in a case where the coordinate measuring apparatus is driven by the CNC operation, the probe is driven automatically in response to results of the teaching, and therefore there is no need for the operator to visually register the distance between the probe and the work piece in minute detail. Also, by employing the second operation mode in such a case and automatically adjusting the light intensity of the light emitted from the emitting optical system, a favorable measurement can be performed. In addition, for example, during the above-described teaching or operation of the probe by the operator, switching between the first operation mode and the second operation mode is also possible.

Furthermore, the present invention can also be achieved at a low cost using software or firmware, for example, and can be applied to an existing coordinate measuring apparatus, as well. For example, in a case where the present invention is achieved with software and an instruction light emitter provided to an existing apparatus is configured to be turned off by the software, the above-described issues caused by heat can be avoided while improving operability even when using an existing apparatus.

According to the present invention, a coordinate measuring apparatus can be provided having a low cost and excellent operability and environmental resistance.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein.

DETAILED DESCRIPTION OF THE INVENTION

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the forms of the present invention may be embodied in practice.

(First Embodiment)

Figure 1:
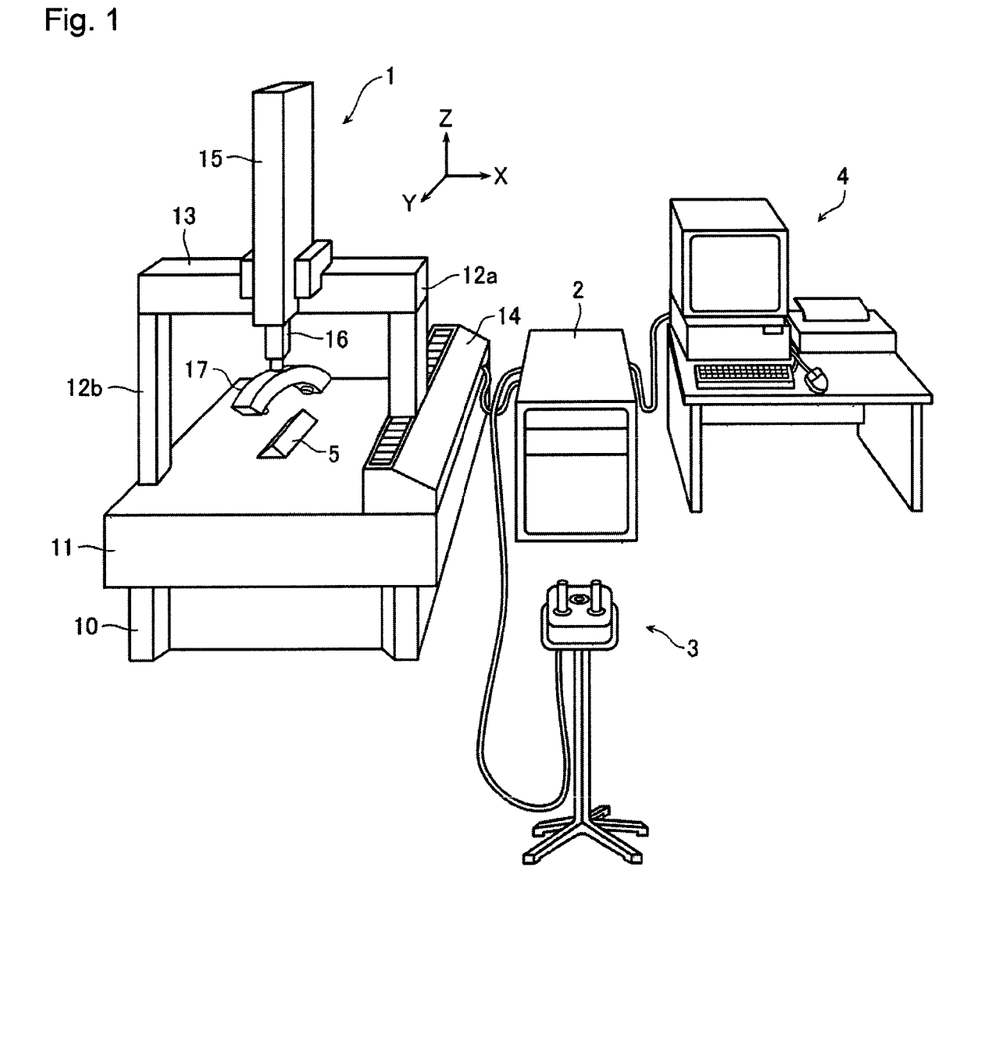
FIG. 1 is an overall view of a system configuring a coordinate measuring apparatus according to a first embodiment of the present invention.

Hereafter, a coordinate measuring apparatus according to a first embodiment of the present invention is described in detail with reference to the drawings. FIG. 1 is an overall view of a system configuring a coordinate measuring apparatus according to the first embodiment. The coordinate measuring apparatus is configured by providing a non-contact-type optical probe 17 according to the present embodiment as a measurement probe of a coordinate measuring apparatus 1. The coordinate measuring apparatus is configured by a drive control apparatus 2 controlling driving of the coordinate measuring apparatus 1 and also capturing necessary measurement coordinate values from the coordinate measuring apparatus 1; an operation panel 3 for manually operating the coordinate measuring apparatus 1 via the drive control apparatus 2; and a host system 4 compiling/executing a parts program which gives instructions for a measurement procedure performed by the drive control apparatus 2, the host system 4 also performing calculations for fitting a geometric shape to the measurement coordinate values captured via the drive control apparatus and logging and transmitting the parts program.

The coordinate measuring apparatus 1 is configured as follows. A stage 11 is placed on top of an anti-vibration table 10 such that a top surface of the stage 11 (as a base surface) aligns with a horizontal plane, and an X-axis guide 13 is supported by top ends of arm support members 12a and 12b, which are provided upright from two lateral ends of the stage 11. A bottom end of the arm support member 12a is driven in a Y-axis direction by a Y-axis drive mechanism 14, and a bottom end of the arm support member 12b is supported by an air bearing so as to be capable of displacement in the Y-axis direction above the stage 11. An X-axis guide 13 drives a Z-axis guide 15 in an X-axis direction, the Z-axis guide 15 extending in a perpendicular direction. A Z-axis arm 16 is provided to the Z-axis guide 15 so as to be driven along the Z-axis guide 15, and the non-contact-type optical probe 17 is mounted on a bottom end of the Z-axis arm 16. Moreover, the optical probe 17 may be capable of rotation within a horizontal plane, and may be capable of rotation within a plane perpendicular to the horizontal plane.

Figure 2:
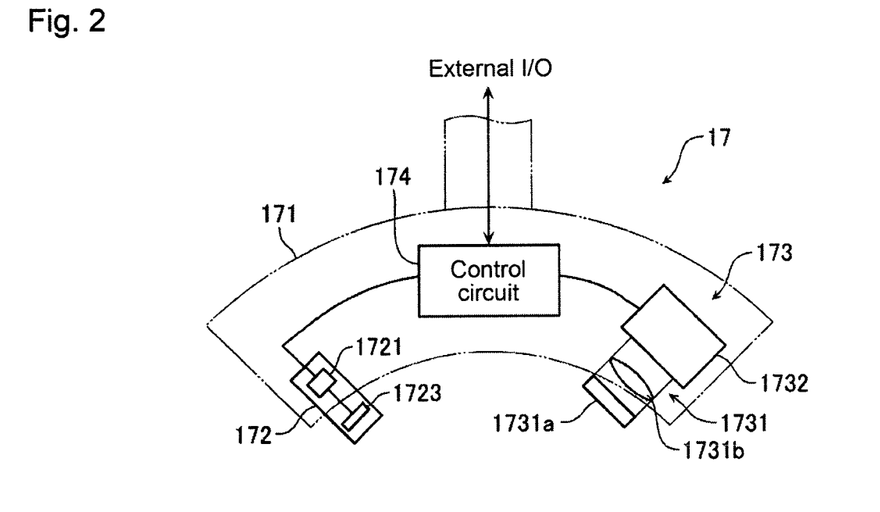
FIG. 2 illustrates a configuration of an optical probe in the coordinate measuring apparatus.
Figure 3A:
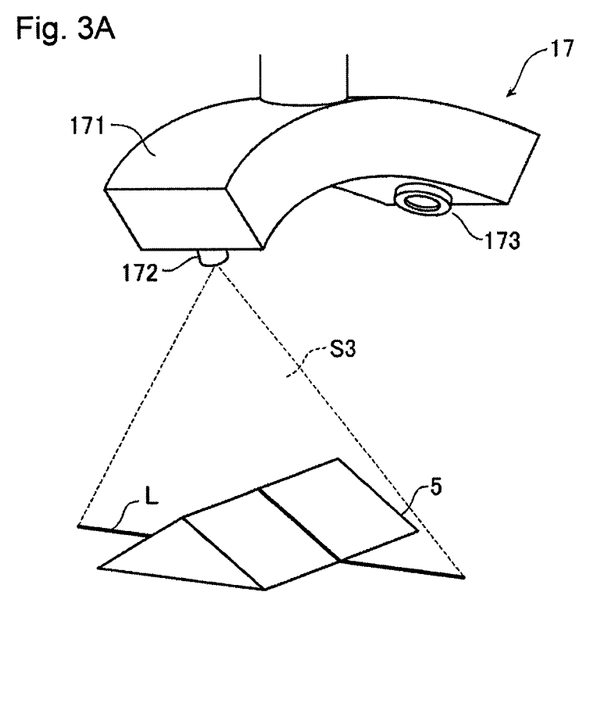
FIGS. 3A and 3B are schematic views illustrating the optical probe of the coordinate measuring apparatus and light emitted using the optical probe.
Figure 3B:
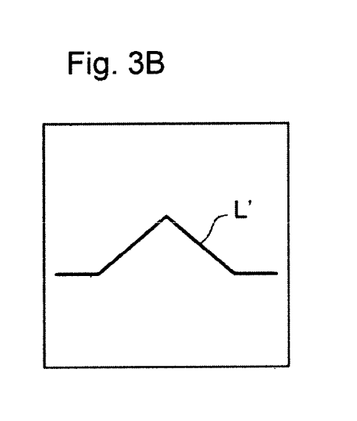

FIG. 2 is a schematic view illustrating a configuration of the optical probe 17 in the coordinate measuring apparatus according to the present embodiment. FIG. 3 is a perspective view of the same. The optical probe 17 includes a casing 171; a emitting optical system 172 arranged within the casing 171; an image capture apparatus 173 capturing an image of a work piece; and a control circuit 174 adjusting an amount of light emitted by the emitting optical system 172 in response to output of the image capture apparatus 173.

The emitting optical system 172 emits light toward a work piece 5, the light being emitted along a predetermined plane (emitting plane) S3. The emitting optical system 172 includes a laser light source 1721 and a beam expander 1723. A laser emitted from the laser light source 1721 is the light emitted along the predetermined plane S3, the light being expanded in a direction orthogonal to the paper surface by the beam expander 1723. The beam expander 1723 is a rod lens or a cylindrical lens, for example. Moreover, when reference is made to "emitted light" in the instant specification, such reference is directed to light that has been emitted from the emitting optical system 172 and has not yet reached a surface of the work piece 5. Furthermore, in the present embodiment, a cylindrical lens or the like is paired with a point light source to generate light which is emitted along a predetermined plane. However, other methods may also be used, such as creating light having a straight-line shape by aligning LEDs in a straight-line shape and pairing them with a frosted optical system, for example.

Light incident on the surface of the work piece 5 spreads in a straight-line or curved-line shape along a straight line or curved line, respectively, configured by a group of points where the predetermined plane S3 and the surface of the work piece 5 intersect. In other words, light is incident in an contour of a cross-section where the work piece 5 is sliced by the predetermined plane S3. When reference is made to "incident light" in the present specification, such reference is directed to light in which emitted light has reached and been reflected by the surface of the work piece 5, and which has a linear shape capable of being imaged.

The image capture apparatus 173 includes an optical system 1731 having a bandpass filter 1731a and a lens 1731b through which a wavelength of the incident light passes, and a CMOS image sensor 1732 capturing an image of the work piece 5 via the optical system 1731. The image capture apparatus 173 captures an image of the work piece 5 from a different position than the emitting plane S3. Specifically, incident light incident on the surface of the work piece 5 and reflected along the shape of the surface of the work piece 5 is received from a predetermined angle by the image capture apparatus 173. Moreover, the bandpass filter 1731a is effective in blocking noise light other than the incident light, being transparent only to incident light, and improving measurement accuracy. However, the bandpass filter 1731a is not essential and can also be omitted.

FIGS. 3A and 3B illustrate light emitted using the optical probe 17 and incident light. As shown in FIG. 3A, when incident light L is incident on the work piece 5 from the emitting optical system 172, the incident light changes shape along an uneven surface shape of the work piece 5 and an contour where the work piece 5 has been sliced by the emitting plane S3 is demarcated. As shown in FIG. 3B, the image capture apparatus 173 captures an image of the work piece 5 at a different position than the predetermined emitting plane S3, and an image of the incident light L as seen from that position is obtained as L'.

Figure 4:
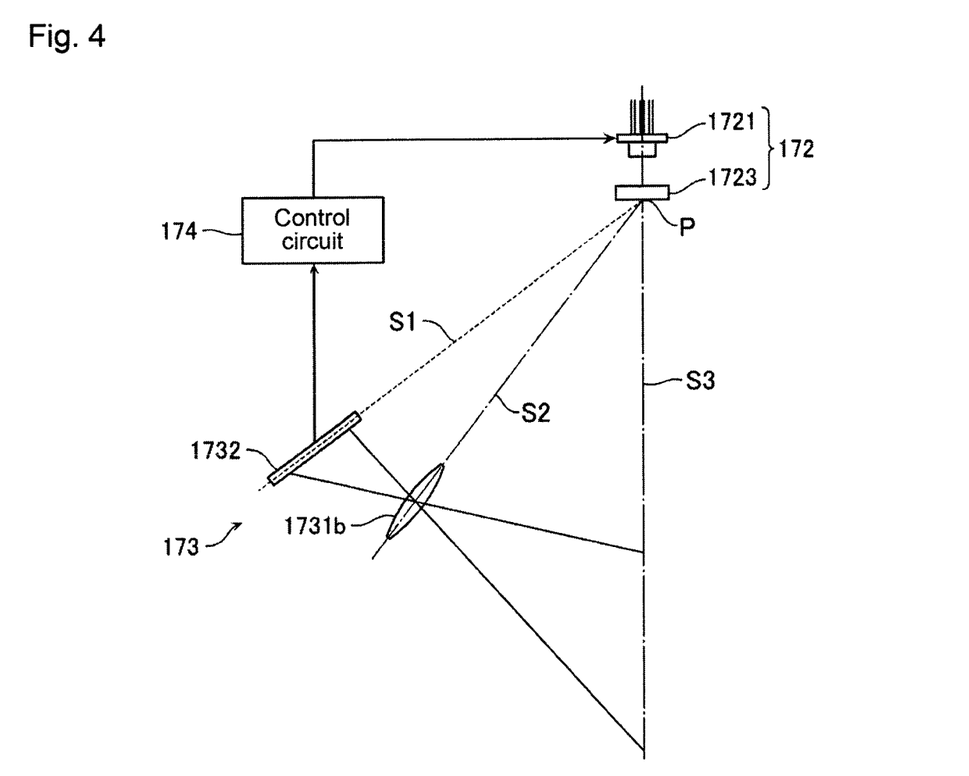
FIG. 4 is a schematic view illustrating positioning within the optical probe of a emitting optical system and an image capture apparatus of the coordinate measuring apparatus.

FIG. 4 is a schematic view illustrating positioning within the optical probe 17 of the emitting optical system 172 and the image capture apparatus 173. The bandpass filter 1731a is omitted from FIG. 4.

The Scheimpflug principle is used in the optical probe 17 according to the present embodiment. As shown in FIG. 4, a plane (hereafter called an "image capture plane S1") that includes an image capture plane of the CMOS image sensor 1732, a principal plane S2 that includes a principal point of the lens 1731b, and a emitting plane S3 of the light emitted at the work piece 5 intersect at a single line located at a point P and orthogonal to the paper surface. With such an arrangement, the entire image capture plane S1 of the CMOS image sensor 1732 is in focus with respect to the emitting plane S3. Herein, a distance between the emitting optical system 172 and the image capture apparatus 173 is known, and an angle between the image capture plane S1 and the emitting plane S3 is also known. Moreover, a distance between the emitting optical system 172 and a position of the surface of the work piece 5 struck by the incident light is defined with reference to a position of an image capture element receiving the incident light reflected on the surface of the work piece 5. Accordingly, a positional relationship between the optical probe 17 and a portion of the work piece 5 struck by the incident light can be calculated with reference to the distance between the emitting optical system 172 and the image capture apparatus 173, the angle between the image capture plane S1 and the emitting plane S3, and the distance between the emitting optical system 172 and the position of the surface of the work piece 5 struck by the incident light. Moreover, the positional relationship between the optical probe 17 and the stage 11 is defined by encoders or the like installed within the X-axis guide 13, the Y-axis drive mechanism 14, and the Z-axis guide 15, for example. Accordingly, the position of the portion of the work piece 5, which is on the stage 11 and which is struck by the incident light, can be calculated.

Figure 5:
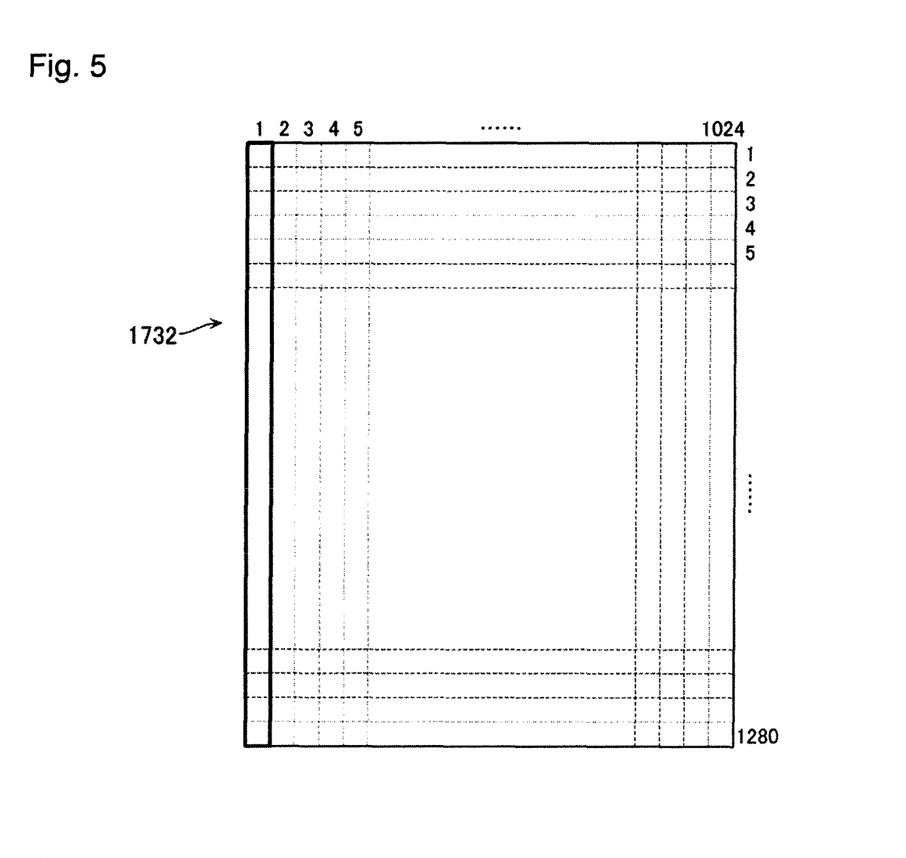
FIG. 5 is a frame view of a CMOS image sensor of the coordinate measuring apparatus.

FIG. 5 is a frame view of the CMOS image sensor 1732 according to the present embodiment. The CMOS image sensor 1732 includes a plurality of image capture elements (CMOS cells) arranged in an matrix on a light-receiving surface. In the present embodiment, the CMOS image sensor 1732 has, for example, 1024 image capture elements in a direction in which the emitted light spreads (an extension direction of a line of intersection between the emitting plane S3 and the image capture plane S1 in FIG. 4) and, for example, 1280 image capture elements in a direction orthogonal thereto. Further, the CMOS image sensor 1732 serves as a rolling shutter. The rolling shutter is a method in which only the image capture elements arranged in one or a plurality of rows (or columns) receive light simultaneously, and the light reception of the row unit (or column unit) occurs in sequence in a columnar direction (or row direction). For example, in FIG. 5, light reception of the image capture elements arranged in a first column (image capture elements emphasized with a thick frame) occurs simultaneously. When the light reception operation is complete, light reception occurs in sequence for a second column and a third column.

Figure 6:
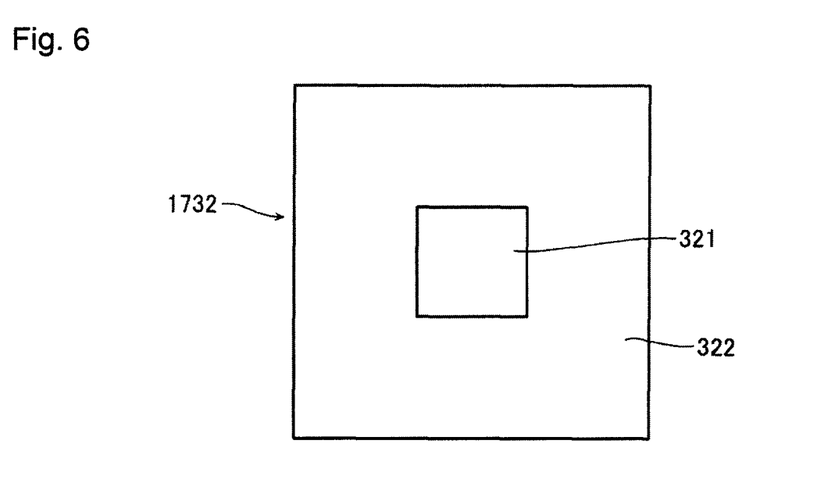
FIG. 6 is a frame view illustrating an image capture region and a monitoring region of the CMOS image sensor.

FIG. 6 is a frame view illustrating an image capture region 321 and a monitoring region 322 of the CMOS image sensor 1732. In the coordinate measuring apparatus according to the present embodiment, a predetermined region of the CMOS image sensor 1732 primarily used in capturing an image of the work piece 5 is treated as the image capture region 321, the entire region of the CMOS image sensor 1732 (including the image capture region 321) is treated as the monitoring region 322, and coordinate measurement is performed using only the image capture elements arranged in the image capture region 321 in a case where detailed measurement is performed. Thereby, a frame rate of the CMOS image sensor 1732 can be increased. Moreover, the image capture region 321 and the monitoring region 322 are regions on the image capture plane of the CMOS image sensor 1732.

Figure 7:
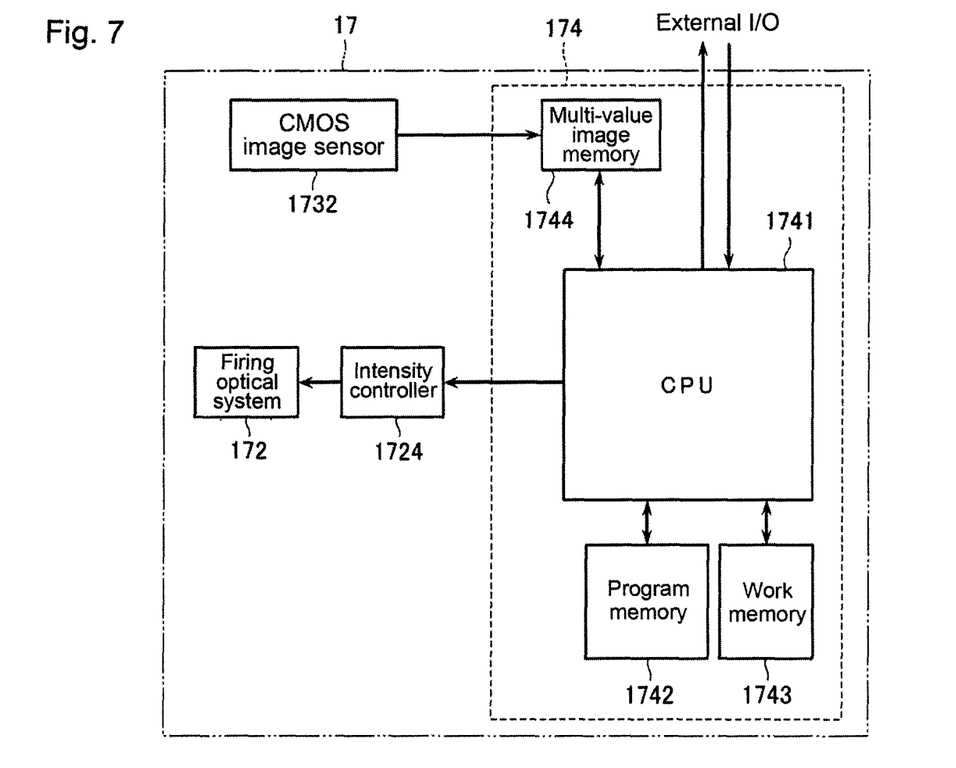
FIG. 7 is a block diagram illustrating a control system of the optical probe of the coordinate measuring apparatus.

FIG. 7 is a block diagram illustrating a control system of the optical probe 17 according to the present embodiment. The control circuit 174 includes a CPU 1741, a program memory 1742 connected to the CPU 1741, a work piece memory 1743, and a multi-value image memory 1744. Image data obtained by the CMOS image sensor 1732 is stored in the multi-value image memory 1744. The CPU 1741 references the image data stored in the multi-value image memory 1744 and adjusts a light intensity of the emitting optical system 172 via an intensity controller 1724.

Next, operations of the coordinate measuring apparatus having the above configuration are described. As shown in FIG. 4, in the present embodiment, the image capture apparatus 173 is arranged at a different position than the emitting plane S3. Accordingly, the direction of light emitted toward a portion of the work piece 5 surface is different from the direction toward the image capture apparatus 173 of a portion of incident light, the incident light being reflected off the portion of the work piece 5 surface. Accordingly, in a case where a distance between the optical probe 17 and the work piece 5, for example, becomes too small or too large, the incident light emitted onto the surface of the work piece 5 falls outside an image capture region of the image capture apparatus 173 and image capture is impossible. In a case where verification as to whether the incident light is received within the image capture region 321 of the image capture apparatus 173 is performed on a display of the host system 4, an operator must visually register both the display and the work piece 5, which is on the stage 11, leading to reduced operability.

Figure 8:
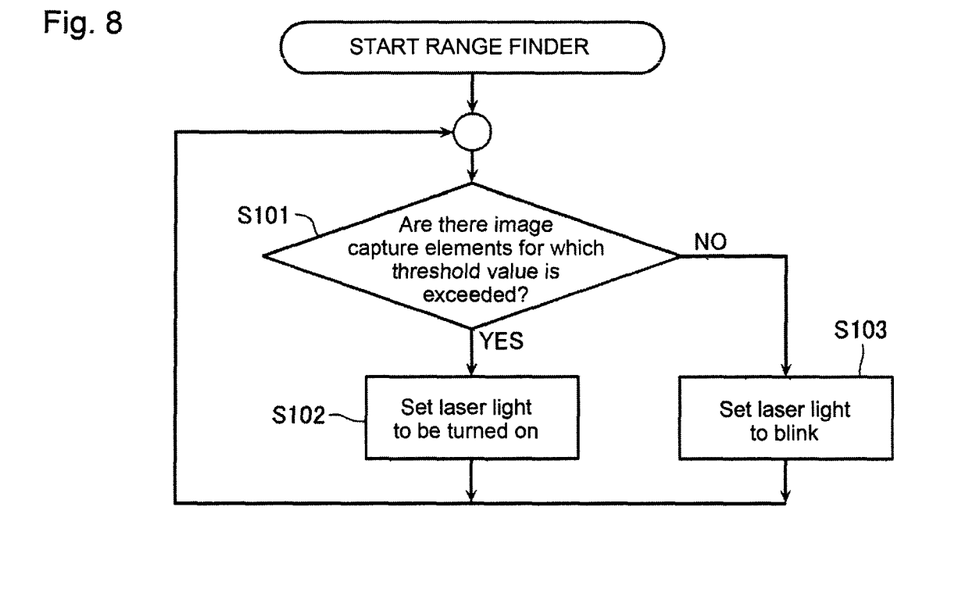
FIG. 8 is a flow chart describing operations of the coordinate measuring apparatus.

FIG. 8 is a flow chart describing operations of the coordinate measuring apparatus according to the present embodiment. In the present embodiment, a blinking status of the incident light can indicate whether the incident light is being received within the image capture region 321 of the image capture apparatus 173. Specifically, the coordinate measuring apparatus according to the present embodiment verifies whether the emitted light is emitting at the work piece 5 during measurement and the incident light in the image capture plane of the CMOS image sensor 1732 is being captured within the image capture region 321 (e.g., verifies whether an amount of light received by the image capture elements arranged within the image capture region 321 is greater than a threshold value) (step S101). In a case where there are, among the image capture elements arranged within the image capture region 321, image capture elements for which the amount of light received is greater than the threshold value, the light emitted from the emitting optical system 172 is turned on (step S102). In a case where there are not, among the image capture elements arranged within the image capture region 321, image capture elements for which the amount of light received is greater than the threshold value, the light emitted from the emitting optical system 172 blinks with a predetermined periodicity at intensities that can be visually registered by the operator (e.g., an intensity near 0 and a predetermined intensity) (step S103). Moreover, in step S101, a determination may also be made with reference to a proportion, relative to the total number of image capture elements within the image capture region 321, of image capture elements for which the amount of light received is greater than the threshold value.

In an embodiment having such a configuration, the incident light is turned on in a case where the distance between the optical probe 17 and the work piece 5 is within a range of distance where the light incident on the surface of the work piece 5 can be imaged by the image capture apparatus 173, and the incident light blinks in a case where the distance between the optical probe 17 and the work piece 5 exceeds that range. Accordingly, a coordinate measuring apparatus can be provided having excellent operability and enabling the operator to verify whether the distance between the optical probe 17 and the work piece 5 is appropriate simply by visually registering the status of the incident light emitted onto the surface of the work piece 5. In a case where the distance between the optical probe 17 and the work piece 5 is not appropriate, the shape of the work piece 5 cannot be measured, and therefore even when the light being emitted from the emitting optical system 172 is made to blink at such a time, there is no effect on the measurement.

In the above, "turned on" refers to a state where, from the operator's perspective, both the emitted light and the incident light are continuously emitted, while "blinking" refers to a state recognizable as blinking from the operator's perspective. Accordingly, even in a case where the emitting optical system 172 is controlled by PWM (pulse width modulation) control, for example, when a determination can be made from the operator's perspective that light is being continuously emitted, this is treated as "turned on" rather than "blinking."

In addition, with the present invention, there is no need to provide a laser pointer or other illumination source to the optical probe 17, and therefore various heat-induced issues detailed above can be inhibited and, further, the optical probe 17 can be made smaller and costs can be reduced by reducing the number of components. Moreover, because the emitting optical system blinks in situations where measurement is impossible, power consumption can also be constrained.

Furthermore, the method according to the present embodiment can be achieved at a low cost using software or firmware, for example, and can be applied to an existing coordinate measuring apparatus, as well. For example, in a case where the present invention is achieved with software and an instruction light emitter provided to an existing apparatus is configured to be turned off by the software, the above-described issues caused by heat can be avoided while improving operability even when using an existing apparatus.

(Second Embodiment)

Figure 9:
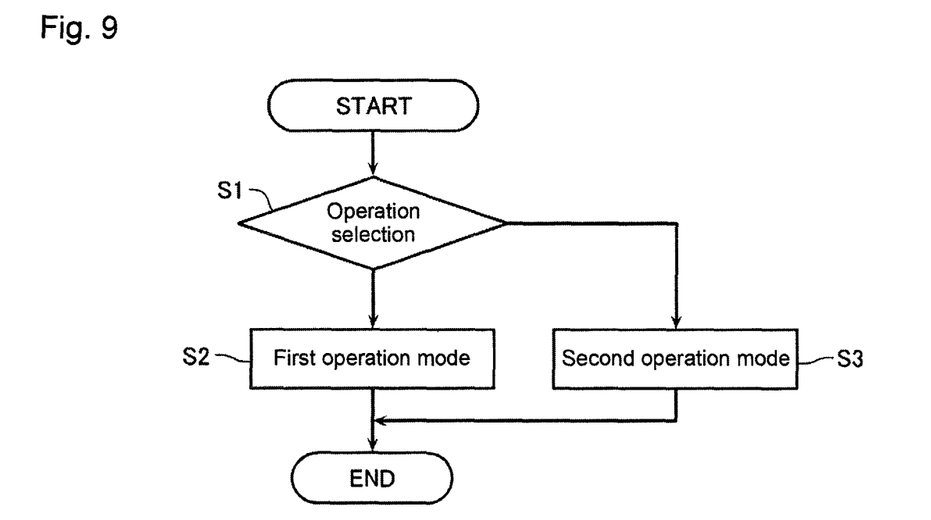
FIG. 9 is a flow chart describing operations of a coordinate measuring apparatus according to a second embodiment of the present invention.

Hereafter, a coordinate measuring apparatus according to a second embodiment of the present invention is described in detail with reference to the drawings. FIG. 9 is a flow chart describing a coordinate measurement method according to the present embodiment. The coordinate measurement method according to the present embodiment differs in that first an operation mode selection process is performed (step S1), and a first operation mode (step S2) or a second operation mode (step S3) is selected in response to the selection operation and the light intensity of the emitting optical system 172 is adjusted. The first operation mode is, for example, a manually operated measurement mode in which the probe is manually operated to carry out the measurement, while the second operation mode is, for example, an automatically operated measurement mode in which the probe is automatically operated to carry out the measurement. In the first operation mode, adjustment of the intensity of the emitted light is performed as described with reference to FIG. 8.

Figure 10:
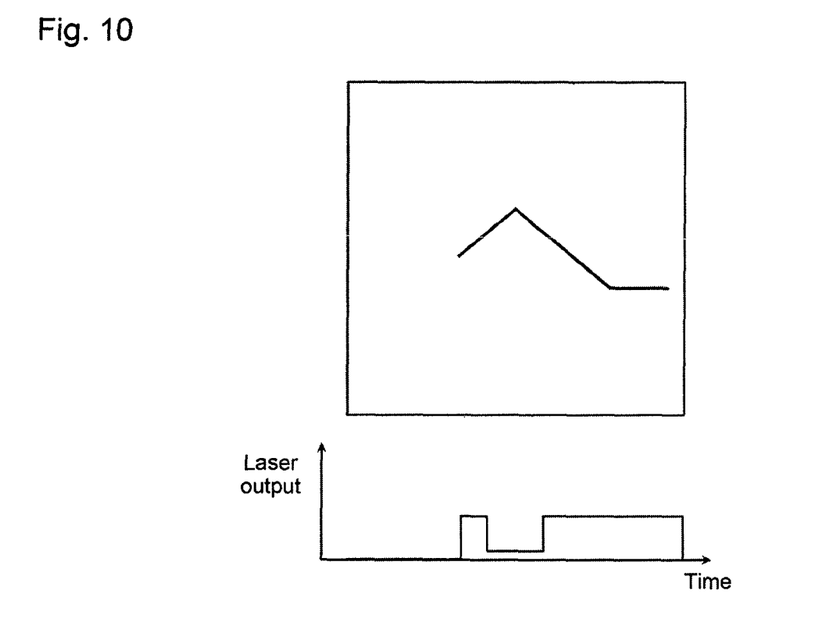
FIG. 10 is a frame view illustrating operations of the coordinate measuring apparatus.

Next, the second operation mode is described. FIG. 10 is a frame view illustrating the second operation mode. An upper portion of FIG. 10 depicts an image captured by the image capture apparatus 173, while a lower portion of FIG. 10 depicts a relationship between output of the emitting optical system 172 and time in an image capture cycle for one frame of the CMOS image sensor 1732. The upper portion and lower portion of FIG. 10 correspond to each other, and an image for one column in the upper portion indicates that an image was captured using the output of the emitting optical system 172 indicated in the lower portion at the time indicated in the lower portion.

In a coordinate measuring apparatus using a triangulation method, in a case where reflectance, for example, differs by location on the surface of the work piece 5, a fluctuation in the amount of light received may lead to various issues. For example, in a case where reflectance of a portion of the work piece 5 surface is extremely elevated, intensity of the incident light from the surface of the work piece 5, which is incident on the CMOS image sensor 1732, may exceed a maximum light intensity for which optimal image capture is possible, leading to saturation and deteriorated measurement accuracy. Also, in a case where reflectance of a portion of the work piece 5 surface is extremely low, the amount of incident light received, which is incident on the CMOS image sensor 1732, may not reach the threshold value and light reception may not occur. However, in a second operation mode, as shown in a right-side portion of FIG. 10, the control circuit 174 adjusts the output of the emitting optical system 172 in response to the amount of light received in the CMOS image sensor 1732. Accordingly, the various issues described above, which arise due to fluctuations in the amount of light received, are resolved.

Further, in the coordinate measuring apparatus using the triangulation method, in a case having a predetermined unevenness or more on the surface of the work piece 5, for example, a portion of the incident light may never be incident on the CMOS image sensor 1732 and light reception for that portion may be impossible. In such a case, there is a risk that the control circuit 174 may determine that light reception is not occurring due to insufficient output of the emitting optical system 172, increase the output of the emitting optical system 172 to a maximum value, and maintain such a state, thus possibly leading to deterioration of the light source and an increase in power consumption. However, in the second operation mode, in a case where light reception by the CMOS image sensor 1732 does not occur regardless of the emitting optical system 172 output being at maximum, as shown by a left-side portion of FIG. 10 (a side of the upper portion with no image of reflected light, and a side of the lower portion where laser output is "0"), the output of the emitting optical system 172 is set to a minimum value, thus achieving a longer life for the light source and reduced power consumption.

Figure 11:
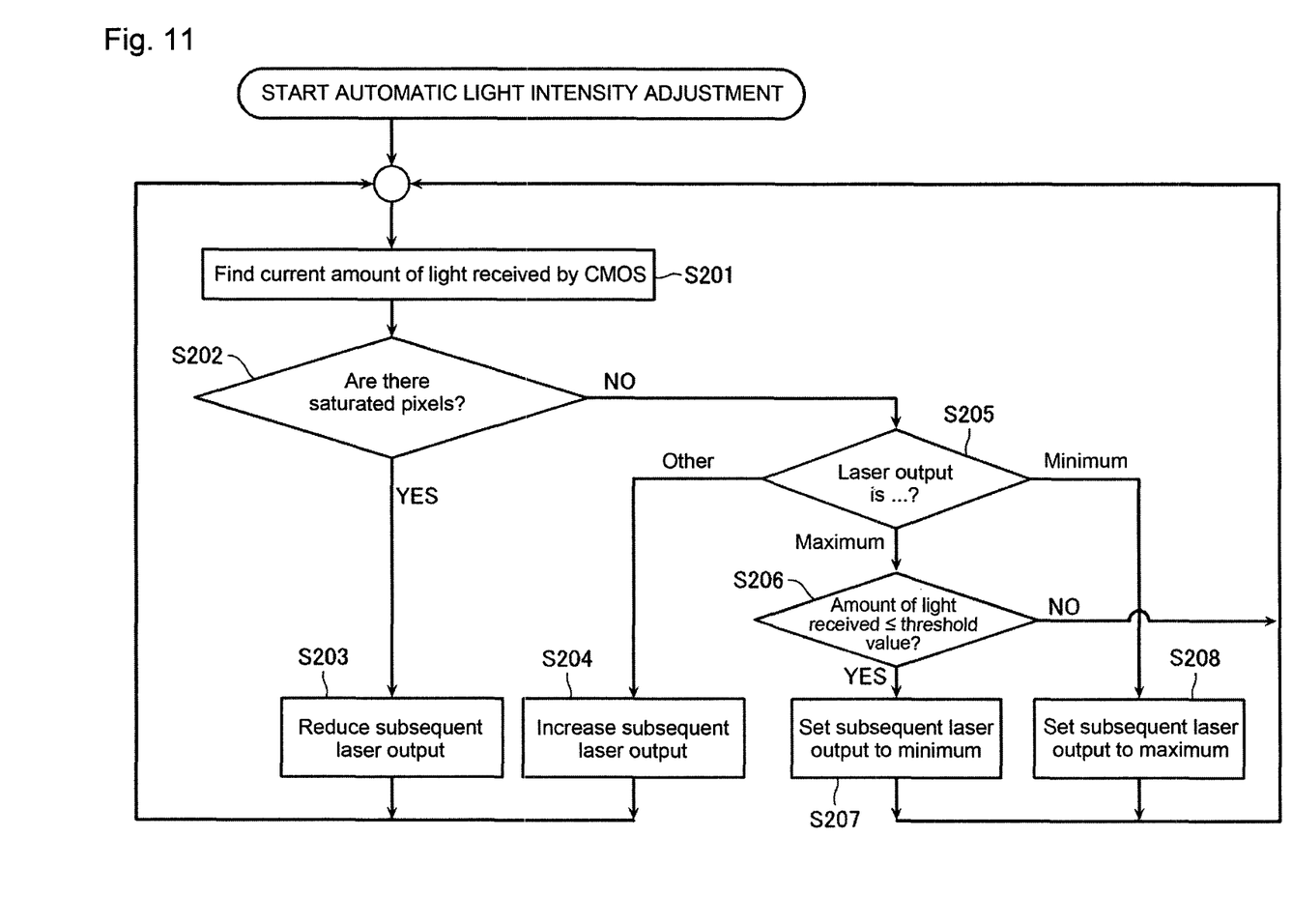
FIG. 11 is a flow chart describing operations of the coordinate measuring apparatus.

FIG. 11 is a flow chart describing the operation modes. In the second operation mode, light reception is first performed for one column (or one row) of the CMOS image sensor 1732 and one-dimensional image data is obtained (S201), then verification is performed as to whether any image capture elements experienced saturation (S202). In a case where an image capture element experienced saturation, the output of the emitting optical system 172 is reduced (S203). In a case where saturation was not detected in step S202, the output of the emitting optical system 172 is confirmed (S205), and in a case where the output of the emitting optical system 172 is neither a maximum output nor a minimum output, the output of the emitting optical system 172 at that position during subsequent scanning is increased (S204). In a case where the output of the emitting optical system 172 is the maximum output, a further verification is performed as to whether the amount of light received by the CMOS image sensor 1732 is equal to or less than a threshold value (S206). Herein, a minimum amount of received light enabling measurement may be set as the threshold value. In a case where the amount of light received by the CMOS image sensor 1732 is equal to or less than the threshold value, the output of the emitting optical system 172 at that position during subsequent scanning is set to a minimum output (S207), and in a case where the amount of light received by the CMOS image sensor 1732 is not equal to or less than the threshold value, the output of the emitting optical system 172 remains at the maximum output. The above process enables the output of the emitting optical system 172 to be set to a minimum value when measuring a non-detection portion of the work piece 5, and heat generation can be inhibited, power consumption can be reduced, and the lifespan of the light source can be extended. Also, in a case where the output of the emitting optical system 172 is at the minimum output in step S205, the output of the emitting optical system 172 is set to the maximum output at that position during subsequent scanning (S208).

The above operations are performed for each column of the CMOS image sensor 1732 shown in FIG. 5, in sequence. Moreover, the image capture elements arranged primarily in the image capture region 321 may be used in the second operation mode, as well, but the image capture elements arranged in the monitoring region 322 can also be used.

Furthermore, the output of the emitting optical system 172 in the non-detection portion may, as noted above, cycle between the maximum value and the minimum value for each scan; however, in a case where n number of scans are performed with the minimum output of the emitting optical system 172 (where n is any integer), for example, the output may be switched to the maximum value. In addition, switching from the minimum output value of the emitting optical system 172 may set the output to an intermediate value between the minimum value and the maximum value, rather than setting to the maximum value.

Moreover, CAD data, for example, may also be input ahead of time and, thereby, a measurement start position and a measurement end position may be defined. In such a case, the CAD data may be input ahead of time to the host system 4 and pass through the drive control circuit 2 to be stored in the program memory 1742. A setting stored in the program memory 1742 ahead of time may also be called up.

The coordinate measuring apparatus according to the present embodiment is, through the first operation mode and the second operation mode, capable of selective operation. Accordingly, in a case where the coordinate measuring apparatus is driven by a CNC operation, for example, teaching may first be performed with respect to the coordinate measuring apparatus, then the coordinate measuring apparatus may operate automatically. Herein, when teaching is performed, the operator must visually register the optical probe 17 and the work piece 5; however, by employing the first operation mode, there is no need to view the display of the host system 4. Accordingly, the operator need only view the optical probe 17 and the work piece 5, and teaching can be readily performed. Meanwhile, in a case where the coordinate measuring apparatus is driven by the CNC operation, the optical probe 17 is driven automatically in response to results of the teaching, and therefore there is no need for the operator to view the optical probe 17 or the work piece 5 in minute detail. Also, by automatically adjusting the light intensity of the emitted light in such a case, a favorable measurement can be performed. In addition, for example, during the above-described teaching or operation of the optical probe 17 by the operator, switching between and selectively using the first operation mode and the second operation mode is also possible.

(Third Embodiment)

Hereafter, a coordinate measuring apparatus according to a third embodiment of the present invention is described in detail with reference to the drawings. The coordinate measuring apparatus according to the present invention is configured in a manner basically similar to the coordinate measuring apparatus according to the first embodiment. However, a method of adjusting the light intensity of the emitting optical system 172 is different.

Figure 12:
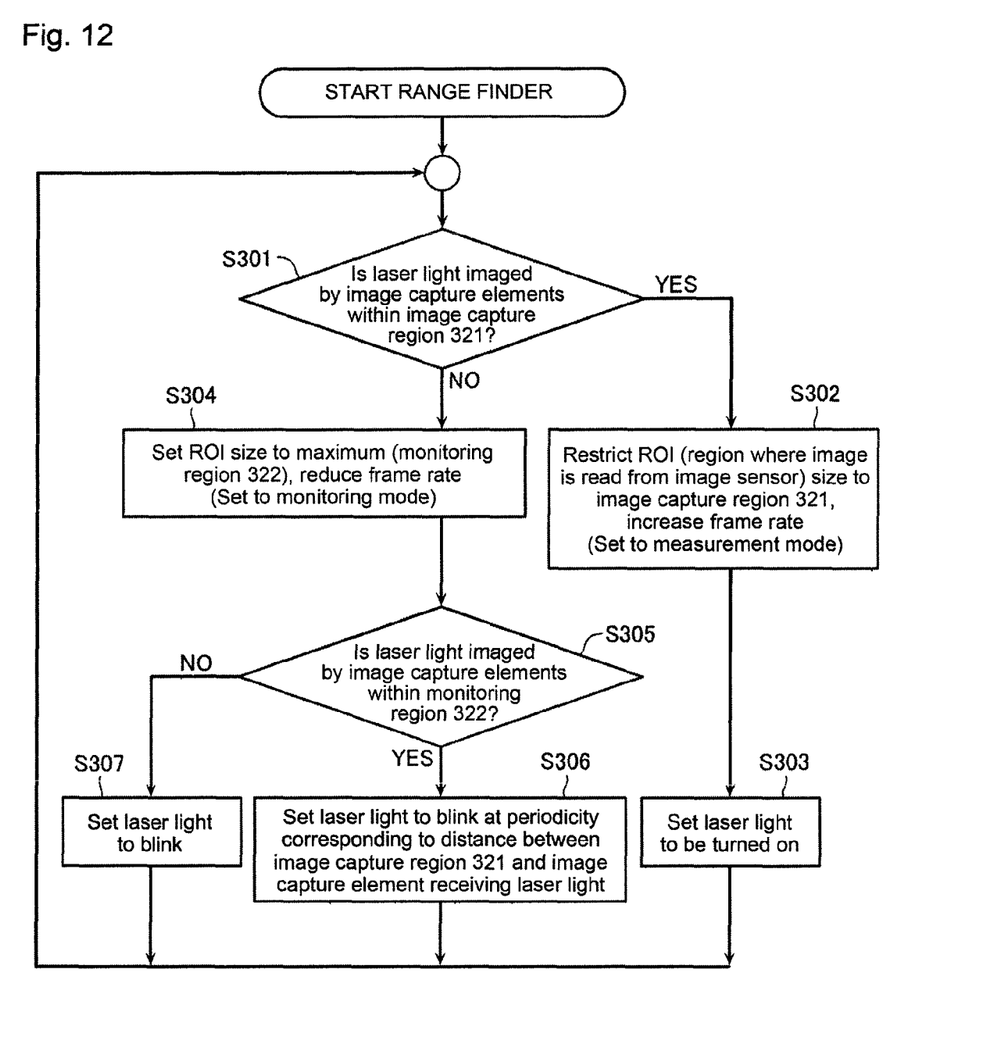
FIG. 12 is a flow chart describing operations of a coordinate measuring apparatus according to a third embodiment of the present invention.

FIG. 12 is a flow chart describing the coordinate measuring apparatus according to the present embodiment. In the present embodiment, emitted light is emitted at the work piece 5 during measurement and verification is performed as to whether incident light is received in the image capture elements arranged in the image capture region 321 (step S301); in a case where the incident light is received, the image capture apparatus 173 is set to a measurement mode (step S302); and the incident light being emitted from the emitting optical system 172 is set to a turned on state (step S303). Moreover, in the measurement mode, a size of an ROI (region of interest, i.e., a region where an image is read from an image sensor) of the image capture apparatus 173 is limited to the image capture region 321 and the frame rate is set to an accelerated speed.

In a case where the incident light is not received in the image capture elements arranged in the image capture region 321, the image capture apparatus 173 is set to a monitoring mode (step S304). In the monitoring mode, the size of the ROI of the image capture apparatus 173 is set to a maximum (monitoring region 322) and the frame rate is set to be slower in comparison to the frame rate in the measurement mode.

Next, verification is performed as to whether the incident light is received in the image capture elements arranged in the monitoring region 322 (step S305), and in a case where the incident light is received in any of the image capture elements arranged in the monitoring region 322, the incident light is set to a blinking state blinking at a period corresponding to a distance between the image capture region 321 and the image capture element where the incident light was received (distance on the light-receiving surface of the image capture apparatus 173) (step S306). For example, the period of the blinking can be made shorter as the incident light approaches the image capture region 321 and longer as the image capture element receiving the incident light moves away from the image capture region 321. The opposite is also possible, and various modes can be defined which the operator is able to visually identify.

In a case where the incident light is also not received in the monitoring region 322, the incident light emitted from the emitting optical system 172 is made to blink at a fixed period (step S307).

Specifically, in the coordinate measuring apparatus according to the present embodiment, the period of the blinking of the incident light is adjusted according to the distance on the image capture plane between the image capture region 321 and the image capture element receiving the incident light. Accordingly, in response to the period of the blinking of the incident light, the operator becomes able to more readily adjust the distance between the optical probe 17 and the work piece 5.

Moreover, in a case where the incident light is received in the above-noted image capture region 321, image capture by the CMOS is performed at a high frame rate, thereby enabling favorable measurement. In addition, typically, in a case where the image capture elements outside the image capture region 321 are not used in measurement, the incident light is not received in the image capture region 321, and in a case where the incident light is received in the monitoring range 322, measurement is not affected even when the frame rate is reduced.

(Fourth Embodiment)

Figure 13:
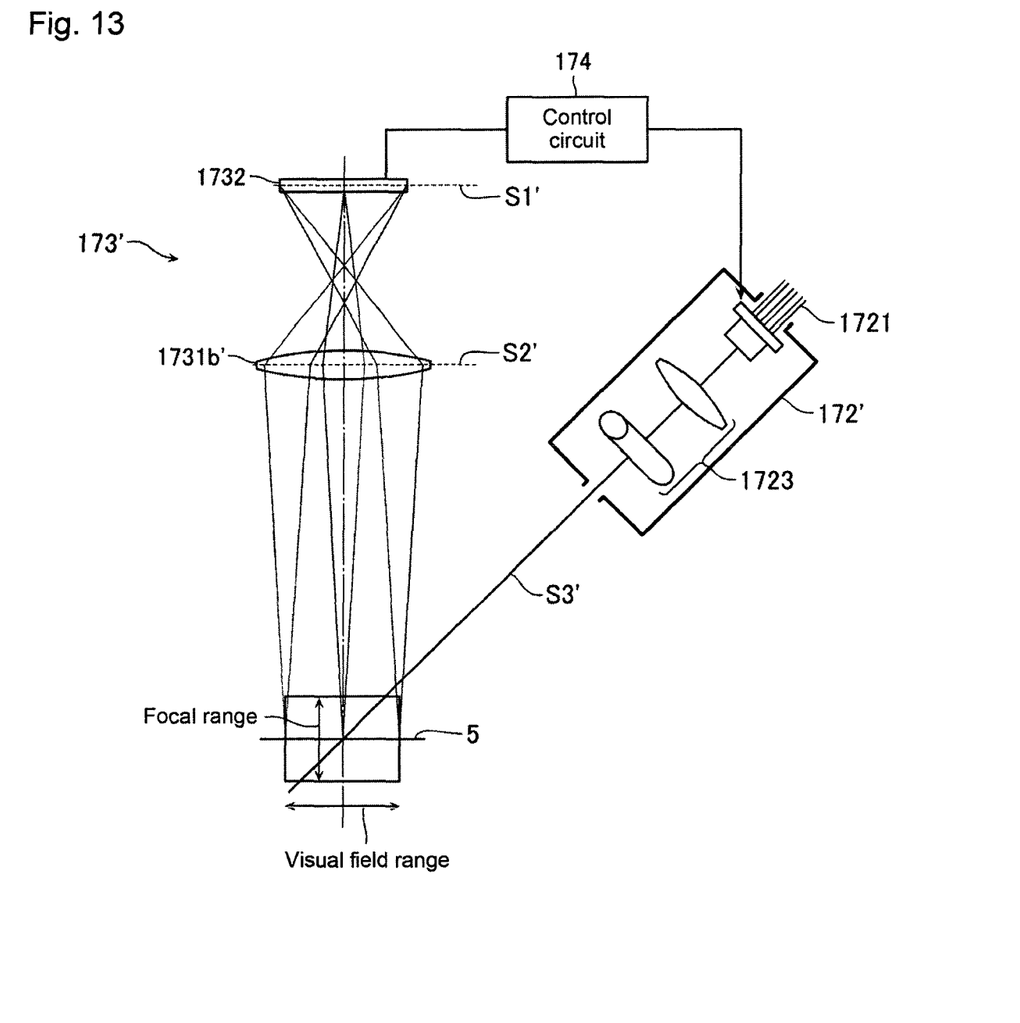
FIG. 13 is a schematic view illustrating positioning within the optical probe of a emitting optical system and an image capture apparatus of a coordinate measuring apparatus according to a fourth embodiment of the present application.

Hereafter, a coordinate measuring apparatus according to a fourth embodiment of the present invention is described. A Scheimpflug optical system was employed in the coordinate measuring apparatuses according to each of the above-noted embodiments. However, use of a Scheimpflug optical system is not strictly necessary. In the present embodiment, a telecentric optical system is used. As shown in FIG. 13, for example, an image capture apparatus 173' and a emitting optical system 172' can also be employed. The image capture apparatus 173' is formed by arranging an image capture plane S1' of the CMOS image sensor 1732 or a CCD image sensor and a principal plane S2', which includes a principal point of a lens 1731b', so as to be parallel. The emitting optical system 172' emits light along a plane S3' covering a region which is a visual field range of the image capture apparatus 173' (more preferably a visual field range of a light-receiving element arranged in the image capture region 321) and a focal range of the lens 1731b'. Moreover, in a case where such an optical system is employed, in order to focus the light incident on the surface of the work piece 5, focal depth of the lens 1731b' in FIG. 13 may be made greater than the focal depth of the lens 1731b in FIG. 4. In a case using such a configuration, coordinate measurement can be optimally performed using a triangulation principle.

(Other Embodiments)

In each of the above-noted embodiments, the image capture apparatus 173 made use of a CMOS image sensor; however, other image capture apparatuses can also be employed, such as a CCD image sensor. Further, the second operation mode and the first operation mode of the second embodiment can also be used in conjunction. In such a case, in a case where the output of the emitting optical system 172 is the maximum output and the amount of light received by all of the image capture elements is equal to or less than the threshold value, for example, the distance between the optical probe 17 and the work piece 5 may be determined to be inappropriate and the incident light may be blinked. Moreover, in a case where the coordinate measuring apparatus uses another configuration (e.g., a camera, a sensor, etc.) capable of recognizing the position of the optical probe 17, for example, the distance between the optical probe 17 and the work piece 5 can also be recognized using that configuration.

Furthermore, in each of the above-noted embodiments, the work piece 5 is arranged on top of the stage 11, and the position of the optical probe 17 is controlled by the arm support members 12a and 12b, the X-axis guide 13, the Y-axis drive mechanism 14, the Z-axis guide 15, and the Z-axis arm 16. However, the present invention is not limited to such an embodiment and may instead be applied to various embodiments of a coordinate measuring apparatus using a triangulation method to obtain the positions of the optical probe 17 and the work piece 5, such as a coordinate measuring apparatus having the optical probe 17 attached to a forefront end of a multijoint arm or a robotic arm, or a coordinate measuring apparatus obtaining the position of the optical probe 17 using another structure such as a camera.

In addition, in each of the above-noted embodiments, the light emitted from the light source is expanded by a cylindrical lens or the like, thereby generating emitted light along the predetermined plane S3. However, the light emitted along the predetermined plane S3 can also be generated by, for example, scanning light from the light source with a scanning mirror (galvano-mirror, polygonal mirror, etc.). Moreover, in a case where the light emitted along the predetermined plane S3 is generated by the scanning mirror and where a CMOS image sensor is employed as the image capture apparatus 173, the period of the scan of the emitted light and the period of the image capture by the CMOS image sensor may be synchronized.

It is noted that the foregoing examples have been provided merely for the purpose of explanation and are in no way to be construed as limiting of the present invention. While the present invention has been described with reference to exemplary embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular structures, materials and embodiments, the present invention is not intended to be limited to the particulars disclosed herein; rather, the present invention extends to all functionally equivalent structures, methods and uses, such as are within the scope of the appended claims.

The present invention is not limited to the above described embodiments, and various variations and modifications may be possible without departing from the scope of the present invention.

What is claimed is:

1. A coordinate measuring apparatus having a non-contact-type probe, the non-contact-type probe comprising:
   an emitting optical system configured to emit light along a predetermined plane at a work piece;
   an image capturer having a plurality of image capture elements arranged on an image capture plane and configured to capture an image of the work piece from a position different from that of the predetermined plane; and
   a controller configured to control the emitting optical system in response to an output signal of the image capture apparatus,
   wherein:
   the controller is configured to determine whether the image capture elements arranged in a predetermined image capture region on the image capture plane detect incident light incident on a surface of the work piece due to the emitted light from the emitting optical system;
   the controller controls the emitting optical system to continuously emit light in a case where the image capture elements arranged within the image capture region detect the incident light; and
   the controller blinks the light emitted from the emitting optical system at a predetermined periodicity in a case where the image capture elements arranged within the image capture region do not detect the incident light.

2. The coordinate measuring apparatus according to claim 1, wherein:

the controller is further configured to determine that the image capture elements arranged in the image capture region detect the incident light in a case where there are, among the image capture elements arranged within the image capture region, image capture elements for which an amount of light received is greater than a threshold value, and the controller is further configured to determine that the image capture elements arranged in the image capture region do not detect the incident light in a case where there are not, among the image capture elements arranged within the image capture region, image capture elements for which the amount of light received is greater than the threshold value.

3. The coordinate measuring apparatus according to claim 1, wherein:

the controller is further configured to detect the distance between the probe and the work piece according to a position of the image capture element which detected the incident light in a predetermined monitoring region, which is broader than the predetermined image capture region on the image capture plane, and in a case where the image capture elements arranged in the image capture region do not detect the incident light, the controller blinks the light emitted from the emitting optical system at a periodicity corresponding to the detected distance.

4. The coordinate measuring apparatus according to claim 1, further comprising a first selective operation mode and a second selective operation mode, wherein:

the controller is further configured to detect the amount of light received by each of the image capture elements arranged in the image capture region, in the first selective operation mode, the controller controls the emitting optical system to continuously emit light in a case where there are, among the image capture elements arranged within the image capture region, image capture elements for which the amount of light received is greater than a threshold value, and blinks the emitted light emitted from the emitting optical system at a predetermined periodicity in a case where there are not, among the image capture elements arranged within the image capture region, image capture elements for which the amount of light received is greater than the threshold value, and in the second selective operation mode, in a case where there are image capture elements saturated by an amount of light received when each of the image capture elements in the image capture region receives light, the controller reduces light intensity of the emitted light emitted from the emitting optical system during the subsequent light reception and, in a case where there are no image capture elements saturated by the amount of light received, the controller increases the light intensity of the emitted light emitted from the emitting optical system during the subsequent light reception and, further, when the image capture elements are receiving light, in a case where the light intensity of the emitted light emitted from the emitting optical system reaches a maximum intensity and the amount of light received is less than the threshold value, the light intensity of the emitted light emitted from the emitting optical system is set to a minimum intensity during the subsequent light reception.

5. The coordinate measuring apparatus according to claim 2, further comprising a first selective operation mode and a second selective operation mode, wherein:

the controller is further configured to detect the amount of light received by each of the image capture elements arranged in the image capture region, in the first selective operation mode, the controller controls the emitting optical system to continuously emit light in a case where there are, among the image capture elements arranged within the image capture region, image capture elements for which the amount of light received is greater than a threshold value, and blinks the emitted light emitted from the emitting optical system at a predetermined periodicity in a case where there are not, among the image capture elements arranged within the image capture region, image capture elements for which the amount of light received is greater than the threshold value, and in the second selective operation mode, in a case where there are image capture elements saturated by an amount of light received when each of the image capture elements in the image capture region receives light, the controller reduces light intensity of the emitted light emitted from the emitting optical system during the subsequent light reception and, in a case where there are no image capture elements saturated by the amount of light received, the controller increases the light intensity of the emitted light emitted from the emitting optical system during the subsequent light reception and, further, when the image capture elements are receiving light, in a case where the light intensity of the emitted light emitted from the emitting optical system reaches a maximum intensity and the amount of light received is less than the threshold value, the light intensity of the emitted light emitted from the emitting optical system is set to a minimum intensity during the subsequent light reception.

6. The coordinate measuring apparatus according to claim 3, further comprising a first selective operation mode and a second selective operation mode, wherein:

the controller is further configured to detect the amount of light received by each of the image capture elements arranged in the image capture region, in the first selective operation mode, the controller controls the emitting optical system to continuously emit light in a case where there are, among the image capture elements arranged within the image capture region, image capture elements for which the amount of light received is greater than a threshold value, and blinks the emitted light emitted from the emitting optical system at a predetermined periodicity in a case where there are not, among the image capture elements arranged within the image capture region, image capture elements for which the amount of light received is greater than the threshold value, and in the second selective operation mode, in a case where there are image capture elements saturated by an amount of light received when each of the image capture elements in the image capture region receives light, the controller reduces light intensity of the emitted light emitted from the emitting optical system during the subsequent light reception and, in a case where there are no image capture elements saturated by the amount of light received, the controller increases the light intensity of the emitted light emitted from the emitting optical system during the subsequent light reception and, further, when the image capture elements are receiving light, in a case where the light intensity of the emitted light emitted from the emitting optical system reaches a maximum intensity and the amount of light received is less than the threshold value, the light intensity of the emitted light emitted from the emitting optical system is set to a minimum intensity during the subsequent light reception.

7. The coordinate measuring apparatus according to claim 4, wherein the first selective operation mode is a manually operated measurement mode in which the probe is manually operated to carry out the measurement, while the second selective operation mode is an automatically operated measurement mode in which the probe is automatically operated to carry out the measurement.

8. The coordinate measuring apparatus according to claim 5, wherein the first selective operation mode is a manually operated measurement mode in which the probe is manually operated to carry out the measurement, while the second selective operation mode is an automatically operated measurement mode in which the probe is automatically operated to carry out the measurement.

9. The coordinate measuring apparatus according to claim 6, wherein the first selective operation mode is a manually operated measurement mode in which the probe is manually operated to carry out the measurement, while the second selective operation mode is an automatically operated measurement mode in which the probe is automatically operated to carry out the measurement.

* * * * *